United States Patent [19]

Yamaguchi et al.

[11] Patent Number: 4,647,501

[45] Date of Patent: Mar. 3, 1987

[54] MAGNETIC RECORDING MEDIUM

[75] Inventors: Nobutaka Yamaguchi; Shinobu Iida; Norio Nasu; Katsumi Ryoke; Toshimitu Okutu; Kenichi Masuyama, all of Kanagawa, Japan

[73] Assignee: Fuji Photo Film Co., Ltd., Kanagawa, Japan

[21] Appl. No.: 815,271

[22] Filed: Dec. 24, 1985

Related U.S. Application Data

[63] Continuation of Ser. No. 589,287, Mar. 14, 1984, abandoned.

[30] Foreign Application Priority Data

Mar. 14, 1983 [JP] Japan .................................. 58-42674

[51] Int. Cl.[4] ............................ G11B 5/70; G11B 5/72

[52] U.S. Cl. .................................. 428/323; 428/423.7; 428/424.6; 428/425.9; 428/694; 428/900

[58] Field of Search ...................... 428/900, 694, 425.9, 428/423.7, 424.6, 323

[56] References Cited

U.S. PATENT DOCUMENTS

| | | | |
|---|---|---|---|
| 3,894,306 | 7/1975 | Sischka | 428/423.7 |
| 3,993,824 | 11/1976 | Shirhata et al. | 428/339 |
| 4,307,154 | 12/1981 | Hosaka et al. | 428/424.6 |
| 4,310,599 | 1/1982 | Akushi et al. | 428/413 |
| 4,329,398 | 5/1982 | Hosaka et al. | 428/425.9 |
| 4,367,261 | 1/1983 | Miyoshi et al. | 428/694 |
| 4,370,384 | 1/1983 | Hosaka et al. | 428/425.9 |
| 4,411,953 | 10/1983 | Miyoshi et al. | 428/900 |
| 4,414,270 | 11/1983 | Miyoshi et al. | 428/329 |
| 4,419,406 | 12/1983 | Isobe et al. | 428/900 |
| 4,443,514 | 4/1984 | Yamamoto et al. | 428/900 |
| 4,452,863 | 6/1984 | Takizuma et al. | 428/900 |

FOREIGN PATENT DOCUMENTS

| | | | |
|---|---|---|---|
| 2915905 | 10/1979 | Fed. Rep. of Germany | 427/131 |
| 31801 | 10/1979 | Japan | 428/423.7 |
| 148504 | 11/1979 | Japan | 428/425.9 |

*Primary Examiner*—George F. Lesmes
*Assistant Examiner*—William M. Atkinson
*Attorney, Agent, or Firm*—Sughrue, Mion, Zinn, Macpeak & Seas

[57] ABSTRACT

A magnetic recording material, which comprises a non-magnetic support having provided on one side thereof a magnetic layer and on the other side thereof a backing layer is disclosed. The binder of the backing layer is comprised of a combination of a cellulose resin, a vinylidene chloride resin, a polyurethane resin and a polyisocyanate. Use of the backing layer increases the durability of the tape and aids in preventing drop out.

8 Claims, No Drawings

MAGNETIC RECORDING MEDIUM

This is a continuation of application Ser. No. 589,287, filed Mar. 14, 1984, now abandoned.

FIELD OF THE INVENTION

The present invention relates to a magnetic recording material provided with a backing layer and, more particularly, to a magnetic recording material excellent in durability.

BACKGROUND OF THE INVENTION

Magnetic recording material must have excellent tape-running properties and high durability on the back side of their supports since they are often wound up and made to run at a high speed.

With the intention of improving the running properties and durability of magnetic tape, it has been proposed to provide a backing layer and to employ cellulose resins, polyurethane resins of polyester type and isocyanate compounds in combination as a binder in the backing layer (e.g., in Japanese Patent Publication No. 44489/81). Further, the examples of the binders used in a backing layer are described in U.S. Pat. Nos. 4,135,016 and 4,273,797. Such binders have a tend to improve the durability of the resulting coated layers under high temperature and high humidity conditions. However, the effects of such binders are still insufficient. In addition, under low temperature and low humidity the the resulting coated films tend to break away creating a great number of drop out spots. Therefore, such magnetic tapes are not well suited for practical use.

SUMMARY OF THE INVENTION

A primary object of the present invention is, therefore, to provide a magnetic recording material which has a film of a backing layer having improved durability.

Another object of the present invention is to provide a magnetic recording material which is not subject to the generation of drop out under either high temperature and high humidity conditions or low temperature and low humidity condition.

As a result of extensive investigation to improve the above-described defects of the binders for a baking layer the present inventors have developed a magnetic recording material which has a backing layer comprised of a coated film having sufficient durability and which is resistant to drop out under high temperature and high humidity conditions as well as low temperature and high humidity conditions as well as low temperature and low humidity conditions. Such a layer is obtained by using vinylidene chloride resins in combination with the above-described three kinds of binder components as a binder which is incorporated in the baking layer.

That is, the present invention comprises a magnetic recording material, which comprises a nonmagnetic support having provided on one side thereof a magnetic layer and on the other side thereof a backing layer, with the baking layer containing (1) a cellulose resin, (2) a vinylidene chloride resin, (3) a polyurethane resin and (4) a polyisocyanate.

DETAILED DESCRIPTION OF THE INVENTION

Cellulose resins which can be used in the present invention include conventionally known ones, and are not limited to any particular ones. Typical examples of the cellulose resins include nitrocellulose, diacetyl cellulose, triacetyl cellulose, acetyl butyl cellulose, cellulose propionate and so on. Particularly, nitrocellulose is preferred. The amount of the cellulose resins used in a baking layer is about 1 to 80% by weight based on the total weight of binders used in a baking layer, preferably 5 to 50% by weight, more preferably 10 to 30% by weight. However, since, water, alcohol and the like may be located close to magnetic tapes in the average home, it is not desirable to use cellulose resins which are soluble in such solvents, e.g., methyl cellulose and the like. Cellulose resins used should have good film formability, heat-resisting property and possess excellent pigment dispersibility.

Examples of vinylidene chloride resins which can be used in the present invention include vinyl chloride-vinylidene chloride copolymers, vinylidene chloride-acrylonitrile copolymers, acrylic acid ester-vinylidene chloride copolymers, methacrylic acid ester-vinylidene chloride copolymers, vinylidene chloride-acrylonitrile-vinyl alcohol copolymers and resins prepared using vinylidene chloride as a monomer. In general, these vinylidene chloride resins have good film formability and are water resistant. The amount of the vinylidene chloride resins used in a backing layer is about 2 to 80% by weight based on the total weight of binders used in a backing layer, preferably 5 to 60% by weight, more preferably 10 to 40% by weight.

Examples of polyurethane resins which can be used in the present invention include polyesterpolyurethane resins and polyetherpolyurethane resins obtained by urethanating polyesterpolyols and polyetherpolyols respectively with diisocyanate compounds. Specific examples of such polyesterpolyols include those synthesized by reacting an organic dibasic acid, such as a saturated or an unsaturated dicarboxylic acid, e.g., maleic acid, adipic acid, etc., an alicyclic dicarboxylic acid, e.g., norbornane dicarboxylic acid, etc., or an aromatic dicarboxylic acid, e.g., pathalic acid, etc., with an glycol such as ethylene glycol, propylene glycol, diethylene glycol, polyethylene glycol, etc., a polyhydric alcohol such as trimethylol propane, hexanetriol, glycerine, pentaerythritol, etc., a polyhydric phenol such as hydroquinone, bisphenol A, etc., or two or more kinds of polyols selected arbitrarily from a group consisting of the above-described glycols, polyhydric alcohols and polyhydric phenols; and lactone type of polyesterpolyols which are synthesized using lactones such as $\epsilon$-caprolacton, $\gamma$-butylolactone and the like. Specific examples of such polyetherpolyols include those synthesized using ethylene oxide, propylene oxide, butylene oxide, etc. Specific examples of such diisocyanate compounds include aromatic diisocyanates such as tolylenediisocyanate, xylylenediisocyanate, 4,4'-diphenylmethanediisocyanate, etc., and aliphatic diisocyanates such as hexamethylenediisocyanate, etc. These polyurethane resins may have as their terminal groups any of the following groups; isocyanate group, hydroxyl group, carboxyl group or a mixture of two or more thereof. A preferred molecular weight of these polyurethane resins ranges from 10,000 to 200,000, more preferably 10,000 to 50,000. The amount of the polyurethane resins used in a backing layer is about 5 to 90% by weight based on the total weight of binders used in a backing layer, preferably 10 to 80% by weight, more preferably 20 to 50% by weight.

Examples of polyisocyanates which can be used in the present invention include conventionally known ones (e.g., those described in Japanese Patent Publication No. 108804/77 and U.S. patent application Ser. No. 357,448 filed on Mar. 12, 1982,) such as an adduct produced from 3 moles of a diisocyanate compound like tolylenediisocyanate, etc., and 1 more of a trihydric polyol like trimethylol propane, etc.; trimer of tolylenediisocyanate and the like; polyisocyanate; polyphenylmethanepolyisocyanates; isophoronediisocyanate; and so on. In these polyisocyanates used in the present invention, the tolylenediisocyanate type substances are preferred. The amount of the polyisocyanates used in a backing layer is about 5 to 90% by weight based on the total weight of binders used in a backing layer, preferably 10 to 80% by weight, more preferably 20 to 50% by weight. Polyisocyanates contribute to the formation of three-dimensional networks in the coated film, and enhance the durability and the solvent-resisting property.

In the preparation of coating composition for a backing layer containing the above-described components (1) to (4), the polyisocyanate is preferably added after a dispersion of a cellulose resin, a vinylidene resin and a polyurethane resin, followed by a dispersion. As a solvent used in the above dispersion, ketones are preferably used. The acetic esters and aromatic solvent may be used in combination. The dispersion is carried out by, for example means as described in Japanese Patent Publication No. 26890/81 (corresponding to U.S. Pat. No. 4,135,016).

In addition to the above-described cellulose resins, vinylidene chloride resins, polyurethanes and polyisocyanates, binder components for a magnetic layer (e.g., a phenoxy resin, an epoxy resin, a polyester resin, an acrylonitrile-butadiene copolymer, etc.) may be optionally used as those for the backing layer.

As additives for the backing layer, inorganic pigments such as magnesium silicate, calcium carbonate, aluminium silicate, barium sulfate, clay, molybdenum disulfide, graphite, titanium oxide and so on; organic finely pulverized grains of benzoguanamine resins, polyethylene terrephthalate, etc.; and additives to be used in a magnetic layer, e.g., an abrasive, a surface active agent, a lubricant, etc. can be employed as occasion demands.

Moreover, addition of carbon black to the backing layer is desirable with respect to advantages of imparting an antistatic effect to the backing layer, improving durability of the backing layer, and so on. Examples of carbon black which can be used include conventionally known ones, and are not limited in sort. However, the grain size of carbon black used is preferably about 10 mμ to 150 mμ, and particularly preferably 50 mμ to 120 mμ. The use of a smaller grain size carbon black tends to deteriorate the durability of the backing layer, whereas a larger grain size carbon black is difficult to be obtained and increasing the size may cause deterioration of electromagnetic properties due to the transfer of increased unevenness of the backing layer surface to the magnetic layer surface. The amount of carbon black used is preferably about 10 to 300% by weight based on the total weight of the binders used in a backing layer, more preferably 20 to 200% by weight, most preferably 50 to 150% by weight.

Examples of useful supports include a polyethylene terephthalate film, a polyethylene naphthalate film, a polyamide film, a polyimide film, a polyvinyl chloride film and so on, most preferably polyethylene terephthalate film. The backing layer may be provided directly on such a film. Surfaces of such a support may receive treatments which impart different smoothnesses thereto. Such a support may have a metal (like aluminum)-evaporated layer or further, may have a subbing layer beneath the magnetic layer or the backing layer as occasion demands. In addition, such a support may be colored with a dye, carbon black or the like. The thickness of these supports can be generally in the range of about 5 to 100 μm, preferaly 7 to 20 μm, but can vary widely over the above range depending upon the utility of magnetic recording media.

The magnetic recording layer of the present invention can be provided using the same ingredients and process as described in Japanese Patent Publication No. 26890/81 (corresponding to U.S. Pat. No. 4,135,016).

The present invention will now be illustrated in more detail by reference to the following examples and comparative examples. However, the scope of the invention is not limited to these examples. Additionally, in the following examples and comparative examples, all parts are by weight.

EXAMPLE 1

| Magnetic Coating Composition | Parts |
|---|---|
| Co—added $\gamma$-$Fe_2O_3$<br>(Particle size: 0.3μ; axial ratio: 1:10;<br>coercive force: 600 Oe) | 300 |
| Vinyl Chloride-Vinyl Acetate Copolymer<br>(Copolymerization ratio: 87:13;<br>polymerization degree: 420) | 30 |
| Plyesterpolyurethane<br>(Reaction product between butylene-adipate and 4,4'-diphenylmethane-diisocyanate; mean molecular weight (weight correspondent to styrene): about 130,000) | 30 |
| $Cr_2O_3$ | 12 |
| Lecithin | 6 |
| Dimethylpolysiloxane | 3 |
| Butyl Acetate | 600 |

The above-described composition was place in a ball mill, and kneaded and dispersed for 48 hours. After adding thereto 40 parts (30 parts by solid component weight) of a polyisocyanate compound (Desmodur L-75, a 75 wt % ethyl acetate solution of an adduct between 1 mol of trimethylolpropane and 3 moles of tolylenediisocyanate), the resulting mixture was subjected to dispersing forces for 30 minutes. After the above-described processing, the mixture was filtered through a filter having an average pore size of 1μ to obtain the magnetic coating composition.

This coating composition was coated on a 14 μ-thick polyethylene terephthalate film having a backing layer, which was previously formed by coating the following composition therebeneath to a dry thickness of 2μ, in a dry thickness of 5μ using a doctor coating process. This was oriented in the longitudinal direction and then, subjected to a calendar roll processing to obtain a wide magnetic recording film. This wide film was slit into video tapes (for VHS use) of a width of ½ inch (Sample No. 1).

| Composition for Backing Layer | Parts |
|---|---|
| Carbon black<br>(Furnace black; grain size: 17 mμ) | 300 |

-continued

| Composition for Backing Layer | Parts |
|---|---|
| Cellulose Resin (Nitrocellulose (H½)) | 100 |
| Vinylidene Chloride Resin (Vinyl chloride-vinylidene chloride copolymer; copolymerization ratio: 65:35; polymerization degree: 400) | 100 |
| Polyurethane Resin (Reaction product between butylene-adipate and 4,4'-diphenylmethanediiso-cyanate; polyesterpolyurethane having molecular weight (weight corresponding to styrene) of about 130,000) | 200 |
| Polyisocyanate (Adduct between 1 mol of trimethylol-propane and 3 mols of tolylenediiso-cyanate; 75 wt % ethyl acetate solution) | 133 |
| Methyl Ethyl Ketone | 2000 |
| Methyl Isobutyl Ketone | 2000 |

The coating composition for a backing layer was prepared by subjecting the above-described components, other than the hardener, to ball mill processing for 90 hours and thereafter, adding the hardener to the resulting dispersion and further, adjusting its viscosity to a proper value. The resulting composition was filtered through a filter having an average pore size of 5μ and then, coated on the support.

EXAMPLE 2

Sample No. 2 was prepared in the same manner as in Example 1 except that the following composition was used as a backing layer composition.

| Coating Composition for Backing Layer | Parts |
|---|---|
| Carbon Black (Lamp black; grain size: 95 mμ) | 300 |
| Cellulose Resin (Cellulose propionate) | 80 |
| Vinylidene Chloride Resin (Acrylic acid ester-vinylidene chloride copolymer) | 120 |
| Polyurethane (Polyetherpolyurethane) | 150 |
| Polyisocyanate (Isophoronediisocyanate) | 150 |
| Talc Powder | 200 |
| $Cr_2O_3$ | 10 |
| Butyl Acetate | 2500 |
| Methyl Ethyl Ketone | 500 |

EXAMPLE 3

Sample No. 3 was prepared in the same manner as in Example 1 except that the following composition was used as a backing layer composition.

| Coating Composition for Backing Layer | Parts |
|---|---|
| Carbon Black (Furnace black; grain size: 50 mμ) | 300 |
| Cellulose Resin (Nitrocellulose, H½) | 75 |
| Vinylidene Chloride Resin (Vinylidene chloride-acrylonitrile copolymer) | 75 |
| Polyurethane (Polyesterpolyurethane) | 175 |
| Polyisocyanate | 133 |
| Iron Oxide Red | 150 |
| Calcium Carbonate | 50 |
| Graphite | 50 |
| Chromium Stearate | 3 |
| Oleic Acid | 1.5 |
| Methyl Ethyl Ketone | 2000 |
| Cyclohexanone | 1500 |

EXAMPLE 4

Sample No. 4 was prepared in the same manner as in Example 1 except that carbon black was removed from the coating composition for the backing layer.

EXAMPLE 5

Sample No. 5 was prepared in the same manner as in Example 1 except that carbon black in the backing layer composition was replaced by the same amount of colloidal silica (having a grain size of 16 mμ).

COMPARATIVE EXAMPLES 1 TO 4

Comparative samples Nos. 6, 7, 8 and 9 were prepared in the same manner as in Example 1 except that the cellulose resin, the vinylidene chloride resin, the polyurethane and the polyisocyanate respectively were removed from the backing layer composition. The amounts of the three remaining binder components were increased in an amount corresponding to that of the binder components removed.

EXAMPLE 6

Sample No. 10 was prepared in the same manner as in Example 1 except that the grain size of the carbon black used in the backing layer composition was changed to 77 mμ.

Results of evaluation are shown in Table 1.

TABLE 1

| Sample No. | | Carbon Black | Cellulose Resin | Vinylidene Chloride Resin | Polyurethane | Polyisocyanate | Drop Out (number/min.) 40° C., 80% RH | 23° C., 60% RH | 5° C., Dry |
|---|---|---|---|---|---|---|---|---|---|
| 1 | Example 1 | present (17 mμ) | present | present | present | present | 10 | 6 | 10 |
| 2 | Example 2 | present (95 mμ) | " | " | " | " | 8 | 6 | 8 |
| 3 | Example 3 | present (50 mμ) | " | " | " | " | 6 | 4 | 7 |
| 4 | Example 4 | absent | " | " | " | " | 41 | 33 | 45 |
| 5 | Example 5 | Colloidal Silica | " | " | " | " | 19 | 17 | 40 |
| 6 | Comparative Example 1 | present (17 mμ) | absent | " | " | " | 300< | 95 | 22 |
| 7 | Comparative Example 2 | present (17 mμ) | present | absent | " | " | 39 | 60 | 300< |
| 8 | Comparative Example 3 | present (17 mμ) | " | present | absent | " | 230 | 164 | 221 |

TABLE 1-continued

| Sample No. | | Carbon Black | Cellulose Resin | Vinylidene Chloride Resin | Polyurethane | Polyisocyanate | Drop Out (number/min.) 40° C., 80% RH | 23° C., 60% RH | 5° C., Dry |
|---|---|---|---|---|---|---|---|---|---|
| 9 | Comparative Example 4 | present (17 mμ) | " | " | present | absent | 300< | 300< | 300< |
| | | | | | | | Scrapes were generated in the Backing Layer | | |
| 10 | Example 6 | present (77 mμ) | " | " | " | present | 3 | 2 | 3 |

With sample Nos. 1, 3, and 10 of the present invention, the number of drop outs was less even if the sample was allowed to stand under adverse circumstances. Less drop outs occurred at high temperature and high humidity, at ordinary temperature and ordinary humidity, and at low temperature and low humidity as compared with the comparative sample Nos. 6 to 9. That is, the samples of the present invention proved to be excellent in durability.

In sample Nos. 4 and 5 in which carbon black was not incorporated, the number of drop outs somewhat increased due to the lack of antistatic effect. Compared with these samples, the sample Nos. 1 to 3, and 10 in which carbon black was incorporated exhibited far better characteristics. Therefore, it is preferred to incorporate carbon black in a backing layer.

In sample No. 9 in which polyisocyanate was not contained, there were conspicuous scrapes in the backing layer. In sample No. 8 in which polyurethane was not incorporated, deterioration was observed at all temperature and humidity conditions. On other hand, the sample No. 6 in which the cellulose resin was not incorporated had deteriorated characteristics when subjected to high temperature conditions, and the sample No. 7 in which the vinylidene chloride resin was not incorporated had deteriorated characteristics when subjected to low temperature conditions.

That is to say, the effect of the present invention can be achieved only by the combined use of (1) a cellulose resin, (2) a vinylidene chloride resin, (3) a polyurethane resin and (4) a polyisocyanate.

The evaluation for the respective samples was carried out in the following manner: Video tape recorders were allowed to stand in separate built-in chambers held at high temperature and high humidity (40° C., 80% RH), at ordinary temperature and ordinary humidity (23° C., 65% RH) and at low temperature and low humidity (5° C., dry) respectively. A sample tape to be evaluated was put into a VHS cassette and run repeatedly under such conditions. After 200 runs, signals were recorded and reproduced, and drop out beyond 1/5 H appearing on the monitor screen was counted by visual inspection with the naked eye and expressed in number per minute. It can be said that the tapes more excellent in its durability the smaller the number of drop out is.

While the invention has been described in detail and with reference to specific embodiments thereof, it will be apparent to one skilled in the art that various changes and modifications can be made therein without departing from the spirit and scope thereof.

What is claimed is:

1. A magnetic recording material. comprising:
a non-magnetic support base having provided on one side thereof;
a magnetic layer comprised of ferromagnetic particles dispersed therein; and
a backing layer provided on the opposite side of the support base, the backing layer being comprised of a cellulose resin in an amount of about 1 to 80% by weight and a vinylidene chloride resin in an amount of about 2 to 80% by weight, a polyurethane resin in an amount of about 5 to 90% by weight and a polyisocyanate in an amount of about 5 to 90% by weight based on the total weight of binders in the backing layer,
wherein the backing layer is further comprised of carbon black particles dispersed therein, and
wherein the carbon black particles have a particle size in the range of about 10 mμ to 150 mμ.

2. A magnetic recording material as claimed in claim 1, wherein the particles size is in the range of 50 mμ to 120 mμ.

3. A magnetic recording material as claimed in claim 1, wherein the cellulose resin is substantially insoluble with respect to water and alcohols.

4. A magnetic recording material as claimed in claim 1, wherein the vinylidene chloride resin is a vinyl chloride-vinylidene chloride copolymer, vinylidene chloride-acrylonitrile copolymer, acrylic acid ester-vinylidene chloride copolymer, methacrylic acid ester-vinylidene chloride copolymers, vinylidene chloride-acrylonitrile-vinyl alcohol copolymer or a resin prepared using vinylidene chloride as a monomer.

5. A magnetic recording material as claimed in claim 1, wherein the polyurethane resin has a molecular weight in the range of 10,000 to 200,000.

6. A magnetic recording material as claimed in claim 1, wherein the backing layer is comprised of a cellulose resin in an amount of about 5 to 50% by weight, a vinylidene chloride resin in an amount of about 5 to 60% by weight, a polyurethane resin in an amount of about 10 to 80% by weight, and a polyisocyanate in an amount of 10 to 80% by weight.

7. A magnetic recording material as claimed in claim 1, wherein the backing layer is comprised of a cellulose resin in an amount of about 10 to 30% by weight, a vinylidene chloride resin in an amount of about 10 to 40% by weight, a polyurethane resin in an amount of about 20 to 50% by weight, and a polyisocyanate in an amount of about 20 to 50% by weight.

8. A magnetic recording material, comprising:
a non-magnetic support base having provided on one side thereof;
a magnetic layer comprised of ferromagnetic particles dispersed therein; and
a backing layer provided on the opposite side of the support base, wherein the backing layer consists essentially of a cellulose resin in an amount of about 1 to 80% by weight, a vinylidene chloride resin in an amount of about 2 to 80% by weight, a polyurethane resin in an amount of about 5 to 90% by weight and a polyisocyanate in an amount of about 5 to 90% by weight, based on the total weight of binders in the backing layer,
wherein the backing layer is further comprised of carbon black particles dispersed therein, and
wherein the carbon black particles have a particle size in the range of about 10 mμ to 150 mμ.

* * * * *